United States Patent [19]

Arisawa et al.

[11] Patent Number: 4,689,128
[45] Date of Patent: Aug. 25, 1987

[54] METHOD OF SEPARATING ISOTOPES

[75] Inventors: Takashi Arisawa; Youji Suzuki; Yoichiro Maruyama; Masaaki Kato; Koreyuki Shiba, all of Ibaraki, Japan

[73] Assignee: Japan Atomic Energy Research Institute, Tokyo, Japan

[21] Appl. No.: 736,975

[22] Filed: May 22, 1985

Related U.S. Application Data

[63] Continuation of Ser. No. 529,508, Sep. 6, 1983, abandoned.

[30] Foreign Application Priority Data

Sep. 14, 1982 [JP] Japan ................................ 57-160537

[51] Int. Cl.$^4$ .............................................. B01D 59/34
[52] U.S. Cl. .......................... 204/157.22; 204/157.21; 250/251
[58] Field of Search ...................... 204/157.22, 157.21; 250/251

[56] References Cited

U.S. PATENT DOCUMENTS

| 4,176,024 | 11/1979 | Garbuny | 204/157.22 |
| 4,187,157 | 2/1980 | Stehle | 204/157.22 |
| 4,327,288 | 4/1982 | Ashkin et al. | 250/251 |
| 4,386,274 | 5/1983 | Altshuler | 250/251 |
| 4,514,363 | 4/1985 | Dubrin | 423/3 |

OTHER PUBLICATIONS

Isotope Separation by Laser-Enhanced Chemical Reaction, Chemical Physics 81 (1983), 473-479; Takashi Arisawa, et al.

Primary Examiner—John F. Terapane
Assistant Examiner—Virginia B. Caress
Attorney, Agent, or Firm—Browdy and Neimark

[57] ABSTRACT

A method is, herein, disclosed for separating a specific isotope from a mixture of isotopes by first irradiating the isotope mixture with a highly monochromatic laser light that resonates only with the energy level of the specific isotope so as to increase its chemical activity and then bombarding said specific isotope with a molecule containing highly reactive atoms so as to form a spatially separated compound rich in the specific isotope.

2 Claims, 3 Drawing Figures ial application is a continuation of application Ser. No. 529,508, filed 9/6/83 now abandoned.

METHOD OF SEPARATING ISOTOPES

This application is a continuation of application Ser. No. 529,508, filed 9/6/83 now abandoned.

BACKGROUND OF THE INVENTION

1. Field of the Invention

The present invention relates to a method of separating isotopes. More particularly, the invention relates to a method of separating a specific isotope from a mixture of isotopes by first irradiating the isotope mixture with a highly monochromatic laser light that resonates only with the energy level of the specific isotope so as to increase its chemical activity and then bombarding said specific isotope with a molecule containing highly reactive atoms so as to form a compound rich in the specific isotope.

2. Description of the Prior Art

For separation of isotopes by laser, it is important to fix and recover the atoms excited by the laser. The conventional technique for attaining this object is to ionize only the excited atoms with a light having a suitable wavelength and to collect them in an electric or magnetic field. This technique, generally referred to as the photoionization method, requires a laser of high power (for multiple-photon ionization) or more than one laser (for multi-stage ionization). The photoionization method is hereunder described in detail with particular reference to the separation of uranium, lithium, calcium, rubidium or lanthanum isotopes.

A mixture of isotopes is irradiated with a laser light that resonates only with the energy level of the target isotope. The target isotope absorbs the laser light and is subsequently irradiated with a laser light from the same or a different source. Upon absorbing the second laser light, ions are generated by photo-ionization of the target isotope and subsequently recovered by physical means. However, in the conventional method, exchange of electric charges occurs between the ions of the target isotope and the other neutral isotopes, and as a result, the number of ions derived from the target isotope is decreased whereas the number of ions derived from the unwanted isotopes is increased, and this leads to lower yields and separation factors.

Furthermore, the cross section of an atom for ionization is smaller than that for excitation by a factor of $10^3$ to $10^4$. Therefore, there is a significant difference in transition probability between excitation from the ground state to the first stage of excitation and from the first stage to the second stage of excitation due to ionization. In order to achieve efficient two-stage ionization, the light source for photoionization must have an intensity $10^3$ to $10^4$ times greater than that of the laser light for the first stage of excitation (selective excitation). Ionization involves an excitation to the continuous energy state and requires a laser of high power although this does not need high monochromaticity.

In three-stage photoionization, three photons having different frequencies are used: the first photon has a frequency that selectively excites the target isotope, the second photon has a frequency that boosts the same isotope to an upper excited state, and the third photon has a frequency high enought to ionize said excited isotope. Therefore, three visible lasers are required, and the overall system including pumping sources and control devices becomes correspondingly complicated.

In the conventional method of separating barium isotopes, their mixture is irradiated with a laser light and by deflecting the orbit of a specific isotope through absorption of the laser light, said isotope can be directly recovered in the electrically neutral state. However, the deflection of the orbit of the specific isotope is so small that the neutral atoms cannot be recovered in high yield.

BRIEF SUMMARY OF THE INVENTION

The present invention separates isotopes by a "selective chemical reaction" wherein a selective isotope in the excited stage enters selectively into a chemical reaction to form an easily separable compound. One advantage of this method is that it does not have to use an ionization laser and requires only a selective excitation laser for immobilizing the excited atom as a compound. Another advantage is a fairly wide latitude in selecting the chemical form of the compound obtained as the reaction product.

Therefore, one object of the present invention is to provide a method of separating isotopes.

Another object of the present invention is to provide a method of separating a specific isotope from an isotope mixture by exciting the specific isotope with a laser light and reacting said isotope with a molecule having a highly reactive atom so as to form a spatially separated compound rich in the specific isotope.

A further object of the present invention is to provide a method of separating a specific isotope from a mixture of isotopes by first irradiating a beam of the isotope mixture with a highly monochromatic laser light that resonates only with the energy level of the specific isotope so as to increase its chemical activity through absorption of the laser light and then bombarding it with a molecule containing a highly reactive atom so as to form a spatially separated compound rich in the specific isotope.

These and other objects and advantages of the present invention will become apparent by reading the following description.

DETAILED DESCRIPTION OF THE INVENTION

According to the present invention, a specific isotope is separated from a mixture of isotopes by first irradiating the isotope mixture with a highly monochromatic laser light which resonates only with the energy level of the specific isotope so as to increase its chemical activity through absorption of the laser light, and then bombarding it with a molecule containing a highly reactive atom so as to form a spatially separated compound rich in the specific isotope.

The most characteristic feature of the present invention lies in the means for separating a specific isotope that has been selectively excited by laser light. According to the invention, the excited isotope is reacted with a molecule containing an atom such as a halogen that has selective reactivity with that isotope to form a spatially separated compound. The term "molecule" as used above includes a radical generated from the molecule containing an atom that has selective reactivity with the excited isotope. Therefore, the method of the present invention is suitable for industrial application without requiring a powerful excitation or ionization laser, or a multiple-wavelength visible laser or pump laser as in the case of three-stage photoionization.

Figure 1A:
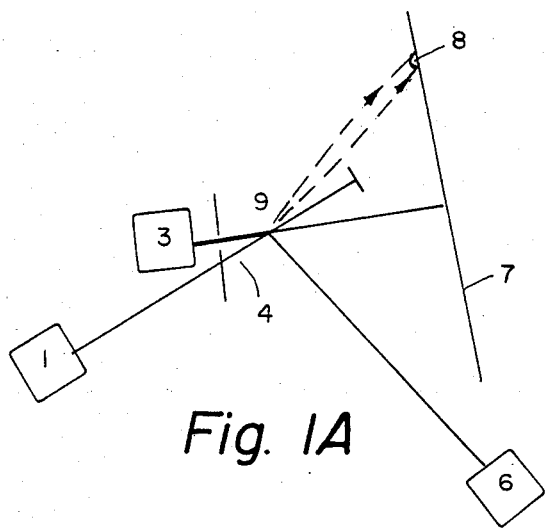
FIG. 1A is a perspective cross-section of the reactor of FIG. 1, taken along line 1—1.
Figure 1:
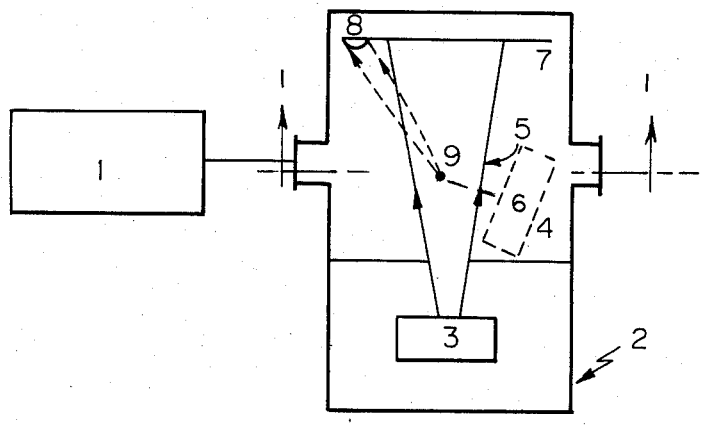
FIG. 1 is a schematic top view of the reactor that is used in one embodiment of the method of the present invention.

The concept of the present invention is hereunder described by reference to the apparatus shown in FIG. 1. This apparatus consists of a vacuum chamber 2 which contains a crucible loaded with a metallic vapor source 3 containing the target isotope. The metal 3 in the crucible becomes molten by resistance heating or electron bombardment, and the resulting metal vapor is collimated by a collimator 4 to form a metal vapor beam 5 which is directed upward. Above the collimator, the beam 5 is irradiated with a laser beam from a laser 1 preferentially exciting particles 9 of the selected isotope. At the same time, a beam of reactive gas emitted from a reactive molecule source 6 crosses the irradiated portion of the vapor beam so as to form a compound 8 which is deposited on a substrate 7. The compound can be recovered as the final product by scrapping it from the substrate. The compound rich in the target isotope produced by reacting said isotope in the excited state with a reactive molecule can be spatially separated by making use of the fact that said compound has a certain distribution of scattering angles with respect to the direction of the metallic vapor beam.

Lasers that can be used in the method of the present invention include dye lasers pumped by gas lasers such as Ar lasers, $N_2$ lasers, He-Cd lasers, solid-state lasers such as Nd-YAG lasers and metallic Cu lasers, and excimer lasers. As is known, these laser systems produce light in the visible spectrum. Also usable is the light that is emitted from these lasers and which is subjected to wavelength conversion with crystals, liquids or gasses, followed by processing with optical devices to provide higher monochromaticity.

Having described the basic concept of the present invention, we now go into further details of the invention by the following example with particular reference to separation of lithium isotopes.

EXAMPLE

A mixture of lithium isotopes containing the target species $^6Li$ was loaded into a crucible and heated by electron bombardment to form an atomic vapor. The vapor was passed through a collimator to form a beam having a fairly high directionality. The target isotope $^6Li$ was selectively excited by photons having a wavelength of 6708 Å, but the other species and those $^6Li$ atoms not excited by the laser light remained in the ground state. The excited atoms were then bombarded with a beam of $CHClF_2$ gas, whereupon LiCl and LiF were produced as the two reaction products in much higher yields than in the absence of irradiation with the laser light. This process involved the following two reactions:

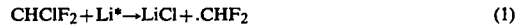

First, the excited lithium atom Li* reacted directly with $CHClF_2$ to form LiCl, and then, the resulting radical $.CHF_2$ reacted with Li* to form LiF. Of the two reaction products, LiF was more $^6Li$-rich than LiCl.

Figure 2:
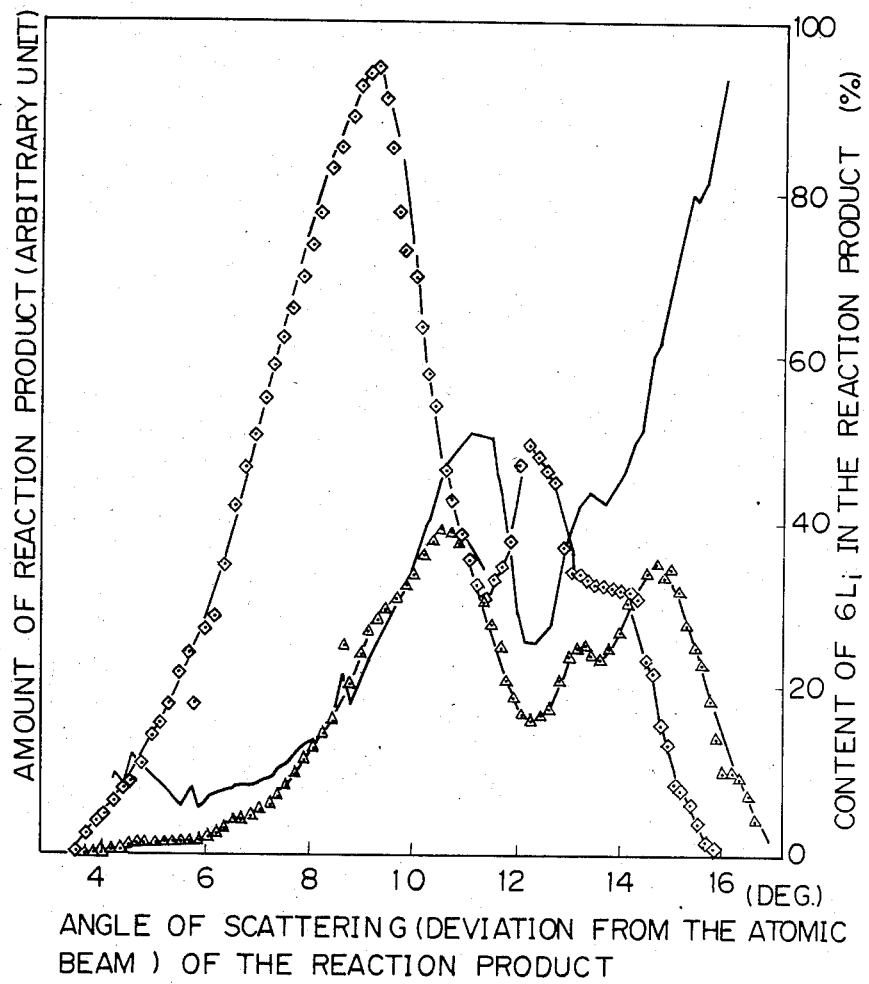
FIG. 2 is a graph showing the distribution of scattering angles for the reaction product obtained by separating a specific lithium isotope by the method of the present invention.

As shown in FIG. 2, the compound $^6LiF$ has a tendency to move in a direction that deviates from the atomic metal vapor and hence can be spatially separated from the isotope mixture. In FIG. 2, —□—□— refers to the amount of $^7LiF$ produced, —Δ—Δ— refers to the amount of $^6LiF$ produced, and — refers to the content of $^6Li$ species in each end compound.

In the above example, $CHClF_2$ was used as a molecule containing atoms having high reactivity with the target isotope, but it should be understood that reactive molecules containing a halogen atom may also be used, and such molecules include $CCl_2F_2$, $CHF_3$, $CCl_2FH$, $CCl_4$, $CF_4$, $CF_3I$ and $CF_3Br$. The method of the present invention can also be used to separate other isotopic atoms such as uranium. According to the present invention, a compound containing only a specific isotope can be directly produced. Since many isotopes are commonly used not in their elemental forms but as labeled compounds, this advantage of the present invention will contribute to an expanded use of lasers in separation of isotopes.

What is claimed is:

1. A method of separating a specific isotopic atom from a mixture of isotopes by first irradiating a beam of the isotope mixture with a highly monochromatic laser light that resonates only with the energy level of the specific isotopic atom, said monochromatic laser light constituting the fundamental wave from a dye laser which is pumped by any one of the group consisting of Ar laser, $N_2$ laser, Nd-Yag laser, metallic Cu laser and He-Cd laser, so as to increase the chemical activity of said isotopic atom through absorption of the laser light, and bombarding said irradiated beam with a molecular beam containing a highly reactive atom whereby a spatially separated compound rich in the specific isotope is formed.

2. A method according to claim 1 wherein said highly reactive atom is a halogen atom.

* * * * *